United States Patent [19]

Wictorin et al.

[11] Patent Number: 4,575,608
[45] Date of Patent: Mar. 11, 1986

[54] METHOD AND APPARATUS FOR SPOT HEATING A BODY, PARTICULARLY FOR BRAZING HARD SOLDER GOLD ALLOYS

[76] Inventors: Lennart Wictorin, Jägarstigen 11, S-131 50 Saltsjö-Duvnäs; Torbjörn Carlberg, Kung Hans Väg 117B, S-191 76 Sollentuna; Mikael Liljendahl, Hirdvägen 8, S-161 54 Bromma, all of Sweden

[21] Appl. No.: 657,909

[22] Filed: Oct. 5, 1984

[30] Foreign Application Priority Data

Oct. 5, 1983 [SE] Sweden ................................ 8305476

[51] Int. Cl.$^4$ ................................................ B23K 1/04
[52] U.S. Cl. .......................... 219/85 BM; 219/85 BA; 219/85 E; 219/349
[58] Field of Search ............. 219/85 BA, 85 BM, 349, 219/85 E, 85 R, 85 M

[56] References Cited

U.S. PATENT DOCUMENTS 3,509,317 4/1970 Valsanakis et al. ............. 219/347 X
3,683,146 8/1972 Nugent et al. ................. 219/85 BM

FOREIGN PATENT DOCUMENTS 300749 5/1968 Sweden .

OTHER PUBLICATIONS

Cary, Howard B., *Modern Welding Technology*, 1979, pp. 199 and 202.

*Primary Examiner*—C. L. Albritton
*Assistant Examiner*—Alfred S. Keve
*Attorney, Agent, or Firm*—Sughrue, Mion, Zinn, Macpeak and Seas

[57] ABSTRACT

A method and a device for performing spot heating of a body, particularly for brazing hard solder gold alloys. In said method an article, for example of a hard solder gold alloy, which is to be heated to a predetermined temperature, is positioned in the focal point of one or more reflecting partial ellipsoids, in whose other focal point or focal points, respectively, an appropriate lamp, for example an IR lamp, is disposed. The radiated heat of the IR lamps causes the article to be heated rapidly and intensely. Temperature control can be carried out subjectively by observing the melting of the solder through a window or alternatively by means of a thermocouple connected to the article. The device of the invention comprises a chamber having an airtight glass cover. On top of this a heating unit is placed consisting of one or more ellipsoid-shaped casings each having an IR lamp in its focal point. In the chamber a support table on which the article to be heated is disposed is positioned in the other focal point of the partial ellipsoid or ellipsoids. The device is provided with a window through which the solder can be viewed, and the device can contain equipment for manipulating the workpiece or the solder from the outside.

6 Claims, 3 Drawing Figures

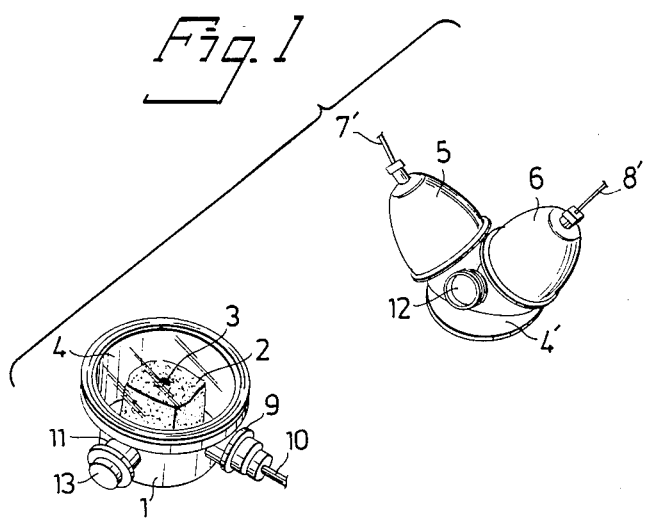
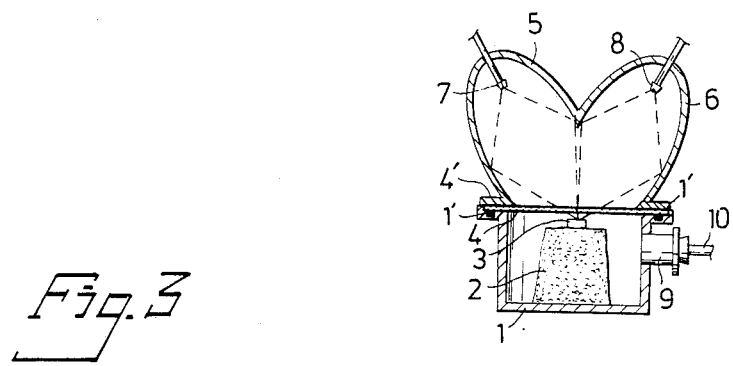
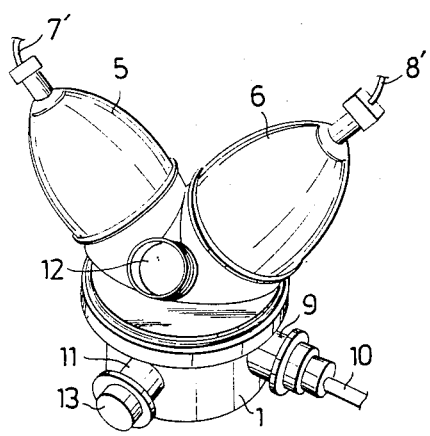

METHOD AND APPARATUS FOR SPOT HEATING A BODY, PARTICULARLY FOR BRAZING HARD SOLDER GOLD ALLOYS

BACKGROUND OF THE INVENTION

1. Field of the Invention

This invention refers to a method and a device for providing spot heating of a body, particularly for carrying out brazing of hard solder gold alloys.

2. Description of the Prior Art

In dental science the molded components of dental gold alloy bridges are united by hard soldering or brazing. At the present time this brazing is carried out with a gas torch flame, for example a flame generated by bottled gas with compressed air or by acetylene and oxygen. However, when the quality of hard solderings performed in this manner is investigated it turns out that defects occur quite often. Thus, in an investigation it has been found that in X-ray detection, wherein defects greater than 0.2 millimeters were detected, defects could be observed in 34% of the examined material.

Furthermore, the fracture surfaces of fractured dental bridges have been studied in a metallographic study. In all of the investigated cases defects were located, such as porosities and inclusions, and at the same time striation patterns could be observed which originated in said defects. These striation patterns show that the fracture is a result of fatigue.

From the above-mentioned investigations the conclusion can be drawn that defects in a brazing of a gold solder alloy can be considered to have great importance for the strength of the dental soldering. If the size and number of defects can be reduced it is possible to expect that a dental gold construction having extended duration may be attained.

Other investigations have shown that the solubility of gas in dental gold alloys can increase in consequence of the use of gas torch flame. This particularly occurs with gold alloys including palladium.

With the purpose of achieving better solderings efforts have been made with furnace soldering, wherein however the results have not been particularly successful because it is difficult to see when the hard solder melts.

SUMMARY OF THE INVENTION

The invention proposes to provide a method and a device to eliminate the above-mentioned disadvantages and to provide a hard soldering having substantially less defects than has been the case previously. The means by which this is achieved are disclosed in the accompanying claims.

BRIEF DESCRIPTION OF THE DRAWING

The invention will be described more specifically in the following with reference to the accompanying drawing, in which FIG. 1 shows a perspective view illustrating the two main components of a device embodied in accordance with the invention, FIG. 2 is a sectional view through the middle of the device of FIG. 1 in assembled state, and FIG. 3 is a perspective view showing the main components of the device assembled. The same reference numerals have been used in the various figures wherever possible.

DETAILED DESCRIPTION

The method and device in accordance with the invention have been developed from the starting point that if the radiating element of an appropriate lamp, for example the filament of an infra-red (IR) radiation lamp, is positioned at one of the focal points of an ellipsoidal mirror all radiation from the lamp will be concentrated at the other focal point of the ellipsoid. Thus, a very high temperature can be achieved at this focal point, and in practical tests it has turned out that a lamp having the power of 250 watts is sufficient to achieve an appropriate temperature for brazing with hard solder gold alloys, i.e. at least 900° Celsius. However, a considerably higher temperature can be achieved, up to about 2000° Celsius. In addition to the advantage that the burning gas flame which occurs in soldering with a gas torch flame is avoided, heating by means of an IR lamp makes it possible to isolate the workpiece from the source of heat fairly simply, namely by positioning the workpiece in an evacuated chamber having an airtight glass cover. The soldering can then be performed in a protective gas or vaccum, thereby achieving the advantage that immediate degassing of the solder melt occurs so that porosities in consequence of gas precipitation during the solidification are effectively avoided.

On the basis of this method, heating can be carried out very rapidly, and furthermore it is easy to control the temperature by adjusting the current. It is also possible to control the temperature automatically by contacting the workpiece with a thermocouple and connecting the thermocouple to regulating means.

In order to follow the soldering process ocularly, a window of glass of appropriate color may be built into the equipment. The soldering points can be moved towards or away from the focal point of the lamp or lamps during the soldering, which can be carried out by moving the lamps horizontally or by means of a manipulator in the gas tight chamber. Alternatively, a manipulator can be used for supplying solder and for moving the soldering point, respectively.

The equipment shown as an example in the accompanying drawing comprises a chamber 1 which can be evacuated and in which a support table 2 of appropriate material can be placed, with the intention being that an article or a gold alloy which is to be melted is placed centrally at the point 3 of table 2. A glass cover 4 is associated with chamber 1. The heating unit is comprised of two semi-detached copper casings 5 and 6, respectively, having inner surfaces which are reflective to a high degree, said casings being provided with a flange 4' which may be positioned on the glass cover 4. The inner surfaces of casings 5 and 6 are shaped as partial ellipsoids, and when the heating unit is positioned on chamber 1 the radiation from IR lamps 7 and 8, which are positioned at the focal point of each ellipsoid in the respective casings 5 and 6, strikes the point 3, as this point comprises the other focal point for the two incomplete ellipsoids. Reference numerals 7' and 8' designate the respective electrical leads for the lamps 7, 8. An example of the path of the light rays is shown in FIG. 2, wherein the casings 5 and 6 and the lamps 7 and 8 positioned in them may be viewed straight from the side and wherein point 3 comprises the striking point of the IR rays.

FIG. 3 shows a perspective view of two parts of the device interconnected, i.e. with casings 5 and 6 disposed on top of chamber 1. A sealing ring 1' (FIG. 2) may appropriately be positioned in the engagement surface between cover 4 and chamber 1 so that appropriate sealing is achieved. A vacuum can be created in the interior of the device by evacuating existing air by means of an outlet 9 and an evacuation conduit 10 connected thereto. Appropriate pressure can be form 1 to $10^{-2}$ torr. As a second alternative a protective gas, in other words an inert gas which is appropriate for soldering, for example argon, may be introduced into the chamber. Both of these alternatives have the purpose of preventing the formation of pores in consequence of the presence of hydrogen and oxygen.

A sleeve 11 extending from chamber 1 can either be terminated by means of a plug 13 or can be provided with an appropriate manipulator (not shown) which is known per se, by means of which it is possible to move the workpiece so that the latter can be placed in correct position in the evacuated or inert atmosphere within the device.

In order that the place of soldering may be viewed from the outside of the device a window 12 forms the termination of a short tube which is disposed between casings 5 and 6. said window 12 may to advantage consist of colored glass so that the eyes of the person viewing the gold alloy while the latter is being heated are not injured.

Heating the gold alloy to the correct temperature may be determined empirically by a trained observer, or alternatively a thermocouple may be permitted to contact the workpiece, whereby it is possible either to read out the temperature, for example on an indicating instrument or a digital display, or to control the temperature by regulating means or both.

An advantage of having the IR lamp as a heat source is that it also emits visible light which makes it possible to look through the mentioned glass window 12 for setting the heat and light rays to exactly the intended position on the article to be melted, i.e. in the illustrated example the gold alloy which is disposed at point 3.

The invention is not limited to the embodiment described above and illustrated in the drawing, and this merely comprises an example of the invention and its mode of application. Thus, it may for example be conceived that a single ellipsoidal casing is used or possibly more than two casings. However, in the first case, in order that the intended melting effect by achieved the temperature of the lamp must be maintained high, which causes the lamp to wear out quickly so that it has to be replaced often. If for example two ellipsoid-shaped casings each having an IR lamp are used, as in the preferred embodiment disclosed above, it is possible to make use of a great deal lower power in each lamp, whereby the lamps will last much longer.

It is also possible to increase the overall size of the device in accordance with the invention and to utilize high power radiation sources, thereby enabling a spot of substantial size to be heated intensely.

It is specifically pointed out that the use of the invention is not restricted to a method and a device for carrying out brazing of hard solder gold alloys and that many other applications may be foreseen. For example, the method and device may be applied in connection with making jewelry.

Furthermore, an alternative to manipulating the workpiece as described above would be to manipulate the solder which for example may take the form of a wire composed of an appropriate alloy.

We claim:
1. A method of spot heating individual articles of varying shapes to a desired temperature between 900° and 2000° Celsius to implement brazing or the like, comprising:
   (a) disposing an article at a common focal point of two angularly positioned, interconnected partial ellipsoids of revolution, said common focal point being located in an evacuated chamber having a glass cover penetrable by IR light through which said article can be viewed,
   (b) positioning a substantially point source IR lamp at each one of other focal points of said interconnected partial ellipsoids of revolution,
   (c) energizing the IR lamps, and
   (d) manually controlling relative displacements between the article and said common focal point to thereby control the temperature of the article.

2. A device for spot heating individual articles of varying shapes to a desired temperature between 900° and 2000° to implement brazing or the like, comprising:
   (a) an evacuable chamber (1),
   (b) two substantially point source IR lamps (7, 8),
   (c) an airtight glass cover (4) for said chamber permeable to IR energy from said lamps,
   (d) a removable adapted to be movably positioned on said chamber overlying the glass cover and comprising two angularly oriented casings (5, 6) each having a reflecting inside surface forming a partial ellipsoid of revolution, each partial ellipsoid of revolution having two focal points located in the same manner as in a complete ellipsoid of revolution, said IR lamps being individually disposed at one focal point of each partial ellipsoid of revolution, and said two partial ellipsoids of revolution being disposed such that their other focal points coincide,
   (e) a support member (2) positioned in the chamber at said coinciding focal points of said two partial ellipsoids of revolution for supporting an article to be heated, and
   (f) a window (12) in said device for viewing the article being heated to enable the manual control of such heating by relative movement between the article and said coinciding focal points.

3. A device in accordance with claim 2, wherein said device is provided with a manipulator for supplying solder and for adjusting the position of a soldering spot, respectively.

4. A device in accordance with claim 2, wherein said chamber is evacuated to a vacuum of $10^{-2}$ torr.

5. A device in accordance with claim 4, wherein a protective gas is confined in said chamber.

6. A device in accordance with claim 2, wherein a protective gas is confined in said chamber.

* * * * *